United States Patent
Wiebe et al.

(10) Patent No.: US 7,503,040 B2
(45) Date of Patent: Mar. 10, 2009

(54) CONFIGURING A SHARED LIBRARY TO ACCOMMODATE RELOCATABLE DATA IN A PERVASIVE DEVICE

(75) Inventors: Peter Wiebe, Ottawa (CA); Filip Spacek, Waterloo (CA)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 10/955,094

(22) Filed: Sep. 30, 2004

(65) Prior Publication Data

US 2006/0074931 A1  Apr. 6, 2006

(51) Int. Cl.
G06F 9/44 (2006.01)
(52) U.S. Cl. ............ 717/164; 713/190; 713/151; 717/173; 717/142
(58) Field of Classification Search ......... 717/162–164; 707/1, 10, 205; 713/190
See application file for complete search history.

(56) References Cited

U.S. PATENT DOCUMENTS

| | | | |
|---|---|---|---|
| 5,313,635 A * | 5/1994 | Ishizuka et al. ............. 717/173 |
| 5,317,723 A | 5/1994 | Heap et al. | |
| 5,408,665 A * | 4/1995 | Fitzgerald ................... 717/163 |
| 5,504,901 A | 4/1996 | Peterson | |
| 5,797,014 A | 8/1998 | Gheith | |
| 5,923,882 A | 7/1999 | Ho et al. | |
| 5,956,513 A * | 9/1999 | McLain, Jr. ................ 717/142 |
| 6,079,015 A | 6/2000 | Harwood, III et al. | |
| 6,219,787 B1 | 4/2001 | Brewer | |
| 6,460,178 B1 | 10/2002 | Chan et al. | |
| 6,862,683 B1 * | 3/2005 | Wille et al. ................. 713/151 |
| 2002/0138748 A1 * | 9/2002 | Hung ........................ 713/190 |
| 2002/0184463 A1 | 12/2002 | Arakawa et al. | |
| 2003/0005248 A1 | 1/2003 | Selkirk et al. | |

OTHER PUBLICATIONS

Linkers & Loaders, John R. Levine, Chapters 1, 2, 3, 7, published Oct. 11, 1999.*
The Design of the Unix Operating System, Maurice J. Bach, 1986, pp. 151-182.*
Peckham, S.B., *User Space Loader*, IBM Technical Disclosure Bulletin, RD v. 42, n 418 at 41877 (Feb. 1999).

* cited by examiner

Primary Examiner—Wei Y Zhen
Assistant Examiner—Phillip H Nguyen
(74) Attorney, Agent, or Firm—Monica Rooney, Esq.; Steven M. Greenberg, Esq.; Carey Rodriguez Greenberg & Paul LLP

(57) ABSTRACT

A method, system, architecture and apparatus for generating a shared library for a pervasive device target platform which can accommodate relocatable data. A tool chain in furtherance of this purpose can be arranged in accordance with the present invention to include a compiler programmed to compile source code into a compiled object and a linker programmed to link the compiled object into a linked object using a relocatable data segment. In this regard, in a preferred aspect of the invention a linker configuration file can be included for use in the linker which specifies the use of the relocatable data segment in lieu of a position independent data segment. The tool chain further can be arranged to include a relocation data extraction tool programmed to extract relocation data from the linked object and to dispose the relocation data in a relocation data file configured for disposition in a pervasive device.

6 Claims, 2 Drawing Sheets

CONFIGURING A SHARED LIBRARY TO ACCOMMODATE RELOCATABLE DATA IN A PERVASIVE DEVICE

BACKGROUND OF THE INVENTION

1. Statement of the Technical Field

The present invention relates to pervasive device applications development and more particularly to configuring a shared library for deployment in a pervasive device.

2. Description of the Related Art

Computing has changed dramatically since the advent of the personal computer in the latter part of the twentieth century. Whilst the vast majority of end user applications operated within the single threaded, single tasking desktop computing environment, modern end user applications operate in a variety of disparate environments. In this regard, the modern computing environment can range from multi-threaded multi-tasking operating desktop computing system, to equivalently advanced pervasive computing devices, including handheld personal digital assistants, cellular telephones, paging devices and the like. To support the rapid growth of the pervasive device market, many applications developed for the desktop computing environment have been ported to the pervasive device computing environment.

Regardless of the computing environment, producing an end user application typically involves the generation of computing source code conforming to a specific computing language specification, followed by a compilation step. The compilation step can produce one or more binary objects suitable for linkage and assembly into an executable application. In this regard, tool chains are widely available in the marketplace which can manage the application generation process. Notably, in the course of developing an executable application, one or more shared libraries can be referenced and relied upon for incorporated logic, resources, or both so that the executable application itself needn't incorporate the referenced logic and resources. To that end, shared libraries can be produced in a similar fashion, though start up code need not be included in a shared library as it must in an executable module.

Shared libraries which have been generated for the pervasive device target platform typically are required to include position independent data and code segments. Position independent data and code segments generally refer to program code and corresponding data which can execute from different locations in memory and are usually associated with older computing environments which lack a memory management unit. In reference to shared libraries, the same library code and data can be mapped to a location in each referencing application using a virtual memory system where it will not overlap the application or other shared libraries.

Relocatable data and code segments, unlike position independent data and code segments, are data and code segments whose memory location can be determined at link time or at run time in reference to a base address. In the simplest model of relocation, the loader performs the final binding of code to specific memory locations, and as it does so, it adjusts or relocates all of the pointers from one part of the loaded program to another. Relocation involves adding a constant, the relocation base, to each address which refers to another location in the same program. The relocation base is usually the same as the address at which the first byte of the program is loaded.

Importantly, to enforce the requirement that shared libraries support position independent data and code segments, the compilation and linkage tools in the tool chains for pervasive device target platforms sometimes do not support relocations to either of the data or text segment. Yet, many well-known programming standards, including the ISO C standard, require compliant tool chains to support relocations in the data segment. As such, a multitude of existing applications developed for the desktop environment cannot easily be ported to the pervasive device environment.

SUMMARY OF THE INVENTION

The present invention addresses the deficiencies of the art in respect to supporting relocatable data in a shared library and provides a novel and non-obvious method, system, architecture and apparatus for generating a shared library for a pervasive device target platform which can accommodate relocatable data. A method for configuring a shared library to accommodate relocatable data in a pervasive target device can include the step of modifying a main entry point in shared library source code to initialize data for the shared library using relocation information disposed in an associated shared library database resource. The modifying step can include inserting program code into the main entry point for causing the shared library to trap a launch code associated with initializing the shared library for use. The modifying step also can include further inserting program code into the main entry point for handling the trapped launch code by initializing the data for the shared library using the relocation information disposed in an associated shared library database resource.

Once modified, the shared library source code can be compiled to produce a compiled shared library object. Subsequently, the compiled shared library object can be linked to produce the shared library. In this regard, the linking of the shared library can be specified to use relocatable data and code segments in lieu of position independent data and code segments. For example, a scatter loading file can be retrieved and modified to indicate linkage using a relocatable data segment. Consequently, relocation information can be included in the linked object. As such, subsequent to linking, the relocation information can be extracted from the compiled shared library object and once extracted, the relocation information can be persisted in the associated shared library database resource.

A tool chain can be arranged in accordance with the present invention to include a compiler programmed to compile source code into a compiled object and a linker programmed to link the compiled object into a linked object using a relocatable data segment. In this regard, in a preferred aspect of the invention a linker configuration file, occasionally referred to as a scatter loading file, can be included for use in the linker which specifies the use of the relocatable data segment in lieu of a position independent data segment. The tool chain further can be arranged to include a relocation data extraction tool programmed to extract relocation data from the linked object and to dispose the relocation data in a relocation data file configured for disposition in a pervasive device.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for configuring a shared library to accommodate relocatable data in a target pervasive device. In accordance with the present invention, a tool chain for producing applications for a target pervasive device can be configured to place the data for an application in a relocatable segment in lieu of placing the data in a position independent segment. Subsequently, the source code for the application can be compiled and linked. The relocation information produced by the linker can be extracted from the linked object and stored in a form suitable for access in the target pervasive device. In this way, upon initializing the data for the application during the execution of the application, the application can access the data according to the relocation information stored in the target pervasive device.

Figure 1:
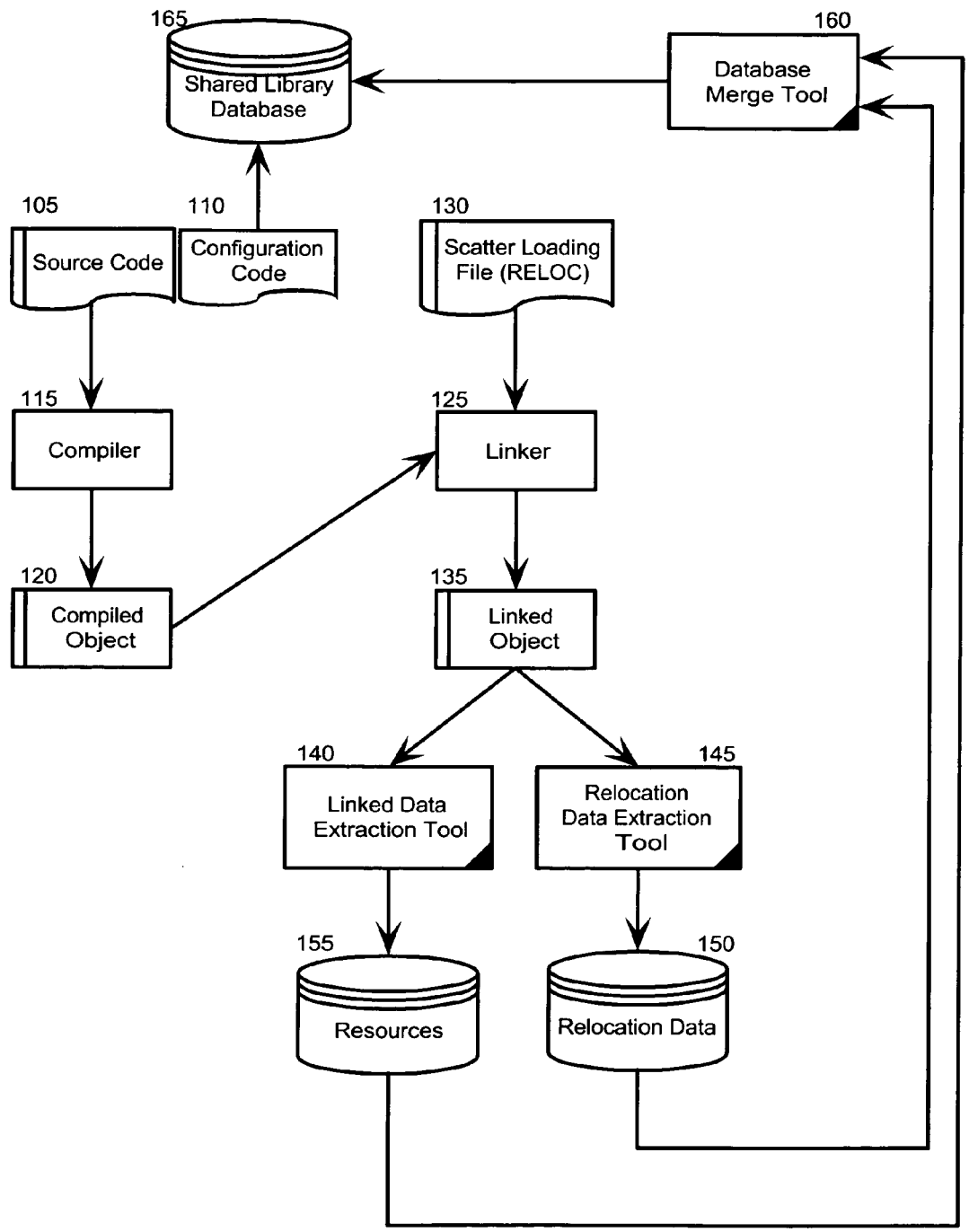
FIG. 1 is a schematic illustration of a system configured to generate a shared library configured to accommodate relocatable data when deployed in a pervasive device target platform; and, FIG. 2 is a flow chart illustrating a process for generating a shared library configured to accommodate relocatable data when deployed in a pervasive device target platform.

In further illustration of the principles of the present invention, FIG. 1 is a schematic illustration of a system configured to generate a shared library configured to accommodate relocatable data when deployed in a pervasive device target platform. The system can include a tool chain including at least a compiler 115 and a linker 125. The compiler 115 can be programmed to process source code 105 into a compiled object 120. The linker 125, in turn, can be programmed to process the compiled object 120 into a linked object 135. Finally, in accordance with the present invention, a relocation data extraction tool 145 and a linked data extraction tool 140 can be included in the tool chain.

The relocation data extraction tool 145 can be configured to extract relocation information from the linked object 135. The relocation data extraction tool 145 further can be configured to store the extracted relocation information in a relocation database file 150 configured for disposition in a target pervasive device. The linked data extraction tool 145, by comparison, can be configured to extract application resource data from the linked object 135. Subsequently, the linked data extraction tool 145 can store the extracted application resource data in a resource database file 155 configured for disposition in a target pervasive device. Finally, both the relocation database file 150 and the resource database file 155 can be merged into a single shared library database 165 through the operation of a database merge tool 160 included in the tool chain.

Notably, the source code 105 of the application can be modified to incorporate configuration code 110. The configuration code 110 can include logic for trapping an initialization event and configuring the addressability of application data according to the relocation information stored in the shared library database 165. In addition to the source code 105, the linker configuration file 130 associated with the linker 125 also can be modified to cause the linkage of the application data and code in a relocatable manner rather than a position independent manner as would be the case otherwise in a target pervasive device. In this way, the relocation data extraction tool 145 can extract the relocation information from the linked object 135 produced in consequence of the modified linker configuration file 130.

Figure 2:
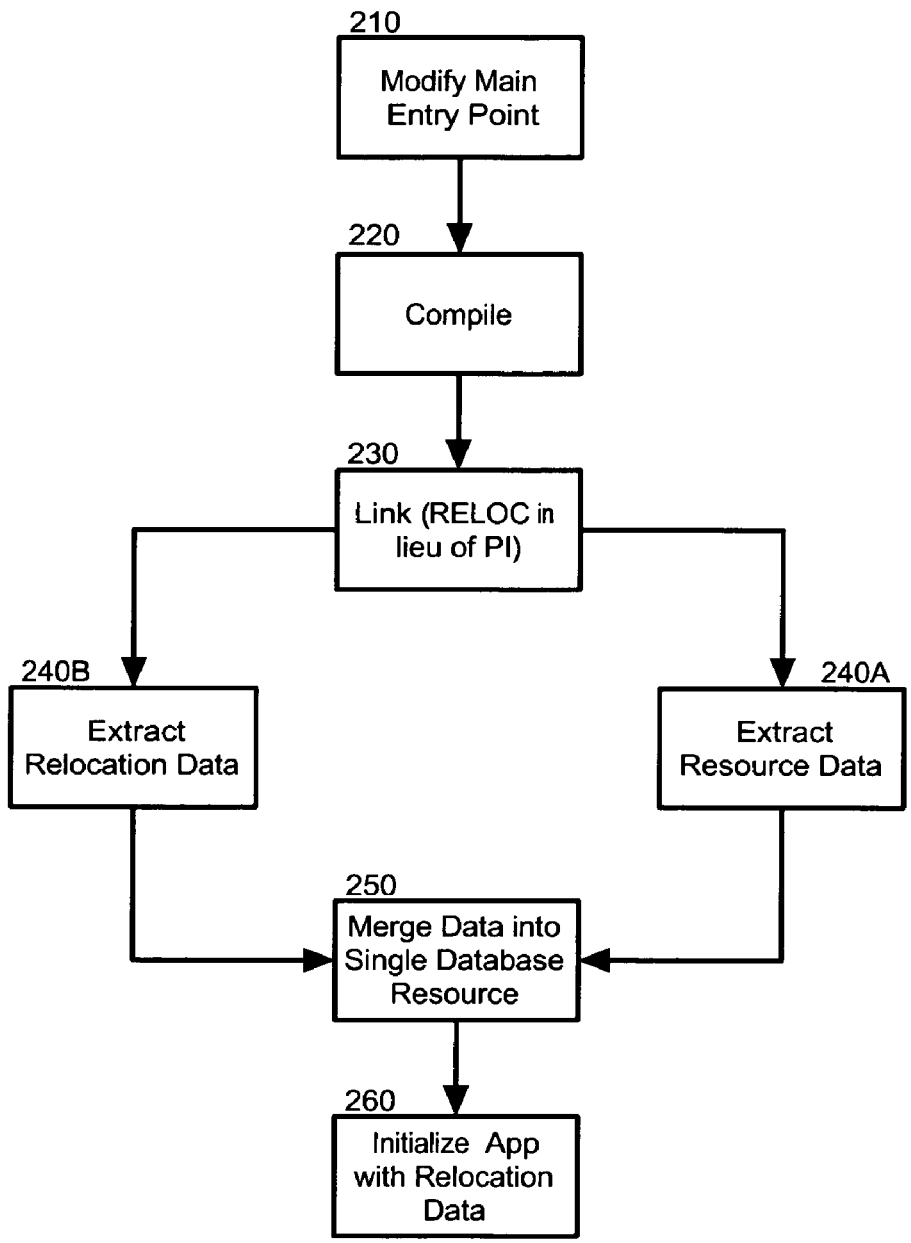

To further explain the operation of the tool chain of the present invention, FIG. 2 is a flow chart illustrating a process for generating a shared library configured to accommodate relocatable data when deployed in a pervasive device target platform. Beginning in block 210, the main entry point of the shared library source code can be modified to trap an initialization event. For example, in a handheld device, the launch code associated with application initialization can be trapped within a case statement and the initialization event can be handled with logic for retrieving the relocation information for the application from a database resource associated with the application. Once configuration logic has been added to the main entry point of the application, in block 220 the shared library source code for the application can be compiled.

In block 230, the object code produced by the compilation step of block 220 can be linked to place application data and code in respective relocatable data and code (text) segments. Notably, the linking can utilize the relocatable data and code segments in lieu of the default position independent data and code segments. In a preferred aspect of the invention, the utilization of the relocatable data and code segements can be specified by modifying a linker configuration file for the linker. Subsequently to the linking step, in blocks 240A and 240B, the relocation data and resource data produced by the linker can be extracted separately and temporarily stored before both are merged in block 250 into a single database resource for the shared library.

In block 260, the application can be executed, in consequence of which the configuration code can be executed according to the modified entry point. Through operation of the modified entry point, the relocation information can be retrieved from the database resource and utilized to properly initialize the application data. In this way, relocatable data can be supported within the pervasive device, despite the inherent support only for position independent data. As a natural consequence of the present invention, then, applications initially developed for the desktop environment which supports relocatable data segments can be more easily ported to the pervasive device environment.

The present invention can be realized in software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for configuring a shared library to accommodate relocatable data in a pervasive target device, the method comprising the steps of:
    modifying a main entry point in shared library source code to initialize data for the shared library using relocation information disposed in an associated shared library database resource;
    specifying linking of the shared library using relocatable data and code segments in lieu of position independent data and code segments;
    compiling said shared library source code to produce a compiled shared library object and linking said compiled shared library object to produce the shared library;
    extracting relocation information from said compiled shared library object;
    persisting said extracted relocation information in said associated shared library database resource;
    wherein said specifying step comprises the steps of:
        retrieving a linker configuration file; and,
        modifying said retrieved linker configuration file to indicate linkage using a relocatable data segment.

2. The method of claim 1, wherein said modifying step comprises the steps of:
    inserting program code into said main entry point for causing the shared library to trap a launch code associated with initializing the shared library for use;
    further inserting program code into said main entry point for handling said trapped launch code by initializing said data for the shared library using said relocation information disposed in said associated shared library database resource.

3. The method of claim 1, wherein said modifying step comprises the step of modifying said retrieved linker configuration file to indicate linkage using a relocatable data segment in lieu of using a position independent data segment.

4. The method of claim 1, further comprising the steps of:
    extracting resource data from said compiled shared library object; and,
    persisting said resource data with said extracted relocation information in said associated shared library database resource.

5. The method of claim 4, wherein said persisting step comprises the step of merging a database file containing said extracted resource data and a database file containing said extracted relocation information into said associated shared library database resource.

6. The method of claim 1, further comprising the step of installing said shared library object and said associated shared library database resource in a pervasive device.

* * * * *

UNITED STATES PATENT AND TRADEMARK OFFICE
CERTIFICATE OF CORRECTION

| | | |
|---|---|---|
| PATENT NO. | : 7,503,040 B2 | Page 1 of 1 |
| APPLICATION NO. | : 10/955094 | |
| DATED | : March 10, 2009 | |
| INVENTOR(S) | : Peter Wiebe Burka and Filip Spacek | |

It is certified that error appears in the above-identified patent and that said Letters Patent is hereby corrected as shown below:

On the Title Page, item (75), after "Peter Wiebe", insert --Burka--.

Signed and Sealed this

Eighth Day of September, 2009

David J. Kappos
*Director of the United States Patent and Trademark Office*